US012011965B2

(12) United States Patent
Furuse et al.

(10) Patent No.: US 12,011,965 B2
(45) Date of Patent: Jun. 18, 2024

(54) SUSPENSION

(71) Applicant: SUBARU CORPORATION, Tokyo (JP)

(72) Inventors: Tomohiro Furuse, Tokyo (JP); Koichi Uchikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/982,778

(22) Filed: Nov. 8, 2022

(65) Prior Publication Data
US 2023/0158852 A1 May 25, 2023

(30) Foreign Application Priority Data

Nov. 22, 2021 (JP) ................................ 2021-189379

(51) Int. Cl.
B60G 21/055 (2006.01)
B60G 3/18 (2006.01)
B60G 7/00 (2006.01)

(52) U.S. Cl.
CPC .......... B60G 21/0551 (2013.01); B60G 3/18 (2013.01); B60G 7/006 (2013.01); B60G 2200/18 (2013.01); B60G 2202/135 (2013.01)

(58) Field of Classification Search
CPC ...... B60G 21/0551; B60G 3/18; B60G 7/006; B60G 2200/18; B60G 2202/135;
(Continued)

(56) References Cited

U.S. PATENT DOCUMENTS 9,393,851 B2 7/2016 Mohrlock et al.
2003/0111805 A1* 6/2003 Carlstedt ............ B60G 21/0553
280/5.511
(Continued)

FOREIGN PATENT DOCUMENTS

CN 210680319 U * 6/2020
CN 214215401 U * 9/2021
JP 2000205321 A * 7/2000 ......... B60G 21/0551

OTHER PUBLICATIONS

Yan, Flat Mirror Image Suspension Assembly, Sep. 17, 2021, EPO, CN 214215401 U, Machine Translation of Description (Year: 2021).*

Primary Examiner — Amy R Weisberg
Assistant Examiner — Matthew D Lee
(74) Attorney, Agent, or Firm — MCGINN I.P. LAW GROUP, PLLC.

(57) ABSTRACT

A suspension includes a housing, suspension links, a spring, and a stabilizer. The housing rotatably supports a rear wheel of a vehicle. The suspension links each have both ends swingably coupled to a vehicle body of the vehicle and the housing. The spring is disposed between the vehicle body and one of the suspension links or the housing. The stabilizer includes a stabilizer bar and a stabilizer link. A force application point where force generated by the spring is applied to the housing is disposed on a rear side of the vehicle with respect to a center of the rear wheel. The stabilizer link is coupled to the housing to allow a force application point where force generated by the stabilizer is applied to the housing to be disposed on the rear side of the vehicle with respect to the center of the rear wheel.

12 Claims, 7 Drawing Sheets

(58) Field of Classification Search
CPC .......... B60G 2206/427; B60G 2200/14; B60G 2200/184; B60G 2204/1224; B60G 3/20
See application file for complete search history.

(56) References Cited

U.S. PATENT DOCUMENTS

| | | | | |
|---|---|---|---|---|
| 2007/0085295 | A1* | 4/2007 | Johnson | B60G 11/15 280/124.152 |
| 2007/0257462 | A1* | 11/2007 | Fader | B60G 3/20 164/113 |
| 2009/0026724 | A1* | 1/2009 | Hirai | B60G 3/20 280/124.134 |
| 2010/0032920 | A1* | 2/2010 | Hong | B60G 21/0551 280/124.109 |
| 2010/0253019 | A1* | 10/2010 | Ogawa | B60G 21/0553 280/5.511 |
| 2017/0129301 | A1* | 5/2017 | Harvey | F16F 1/374 |
| 2020/0376918 | A1* | 12/2020 | Romelhardt | B60G 17/0152 |
| 2022/0250430 | A1* | 8/2022 | Kolp | B60G 7/02 |
| 2023/0150326 | A1* | 5/2023 | Furuse | B60G 3/202 280/124.11 |

* cited by examiner

SUSPENSION

CROSS-REFERENCE TO RELATED APPLICATIONS

The present application claims priority from Japanese Patent Application No. 2021-189379 filed on Nov. 22, 2021, the entire contents of which are hereby incorporated by reference.

BACKGROUND

The disclosure relates to a suspension for a vehicle, such as an automobile.

A suspension for a vehicle, such as an automobile, couples a hub bearing housing (hereinafter referred to as a "housing") that rotatably supports a wheel to a vehicle body via links, i.e., arms, and holds the housing in a state in which the housing is able to make a stroke with respect to the vehicle body by swinging of the links.

As a technique related to a suspension, for example, U.S. Pat. No. 9,393,851 B2 discloses a five-link multilink suspension that mainly determines a position of a camber angle by using a pair of front and rear lower links and a pair of front and rear upper links, and determines a position of a toe angle by using a control link.

SUMMARY

An aspect of the disclosure provides a suspension to be applied to a vehicle. The suspension includes a housing, suspension links, a spring, and a stabilizer. The housing is configured to rotatably support a rear wheel of the vehicle. The suspension links each have both ends swingably coupled to a vehicle body of the vehicle and the housing. The spring is disposed between the vehicle body and one of the suspension links or between the vehicle body and the housing. The stabilizer includes a stabilizer bar and a stabilizer link. The stabilizer bar is configured to generate reaction force corresponding to a stroke difference between left and right housings each serving as the housing. The stabilizer link couples both ends of the stabilizer bar to the left and right housings respectively. A force application point where force generated by the spring is applied to the housing is disposed on a rear side of the vehicle with respect to a center of the rear wheel. The stabilizer link is coupled to the housing to allow a force application point where force generated by the stabilizer is applied to the housing to be disposed on the rear side of the vehicle with respect to the center of the rear wheel.

An aspect of the disclosure provides a suspension to be applied to a vehicle. The suspension includes a housing, suspension links, a spring, a shock absorber, and a stabilizer. The housing is configured to rotatably support a rear wheel of the vehicle. The suspension links each have both ends swingably coupled to a vehicle body of the vehicle and the housing. The spring is disposed between the vehicle body and one of the suspension links or between the vehicle body and the housing. The shock absorber is disposed between the vehicle body and one of the suspension links or between the vehicle body and the housing. The stabilizer includes a stabilizer bar and a stabilizer link. The stabilizer bar is configured to generate reaction force corresponding to a stroke difference between left and right housings each serving as the housing. The stabilizer link couples both ends of the stabilizer bar to respective left and right shock absorbers each serving as the shock absorber. A force application point where force generated by the spring is applied to the housing is disposed on a rear side of the vehicle with respect to a center of the rear wheel. The stabilizer link is coupled to the shock absorber to allow a force application point where force generated by the stabilizer is applied to the housing to be disposed on the rear side of the vehicle with respect to the center of the rear wheel.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
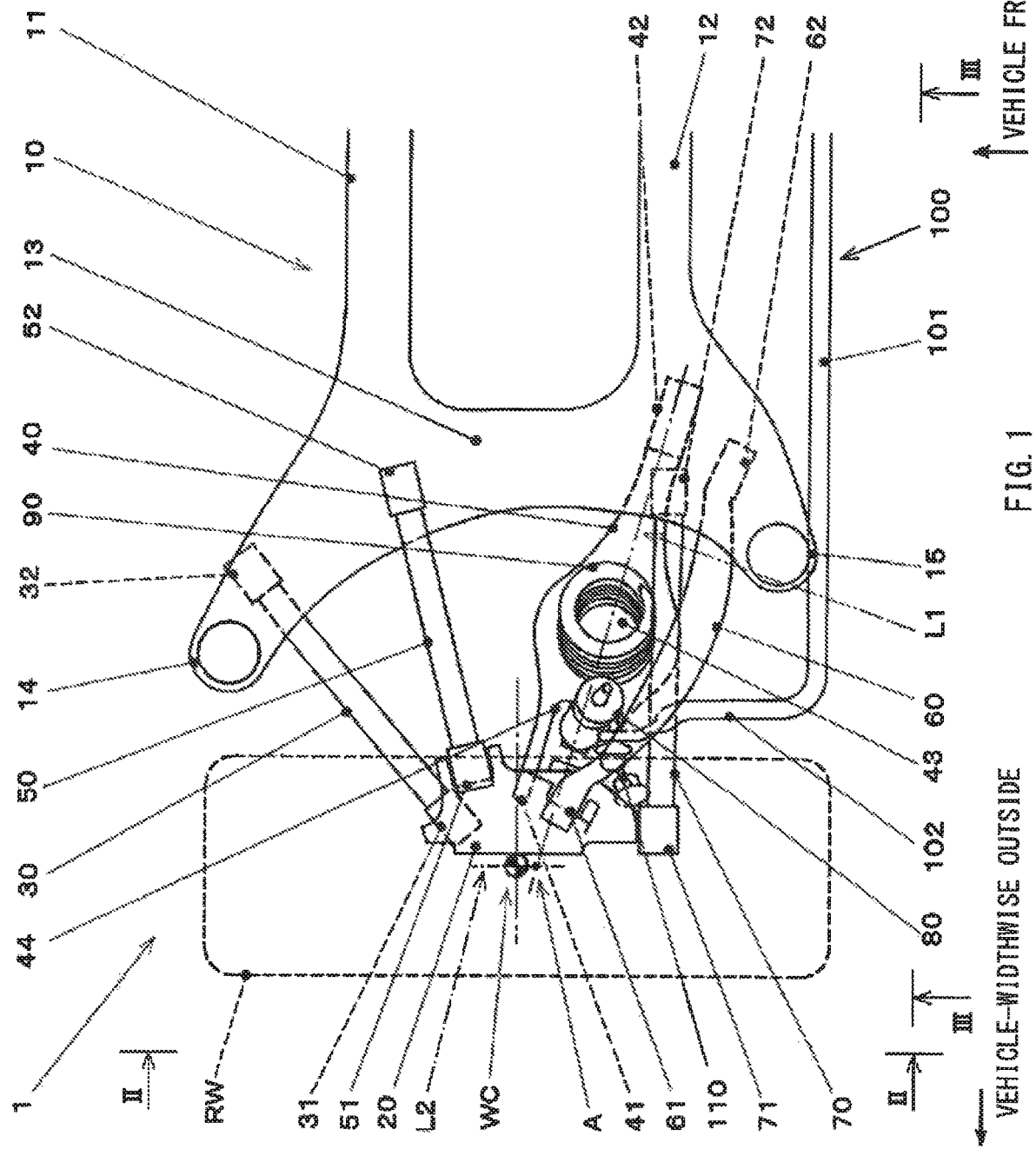
FIG. 1 is a plan view of a suspension according to one example embodiment of the disclosure as viewed from above a vehicle.

In a multilink suspension, a housing rotates about a rotation central axis of a wheel, i.e., an axle, with respect to a vehicle body in some cases.

For example, in the technique disclosed in U.S. Pat. No. 9,393,851 B2, a force application point where reaction force of a spring is applied to the housing is disposed on a rear side with respect to a wheel center.

On the other hand, a force application point where a stabilizer that generates reaction force depending on a stroke difference between left and right suspensions applies the reaction force to the housing is disposed on a front side with respect to the wheel center.

In such a configuration, for example, in a straight traveling state of a vehicle, a moment causing the housing to rotate rearward about the axle is applied by a load caused by supporting, with the spring, a so-called sprung weight such as the vehicle body.

If the vehicle enters a turning state, the suspension on a turning outer wheel side starts to make a stroke in a bump direction, i.e., a contraction direction, and the stabilizer starts to generate the reaction force, a moment causing the housing to rotate frontward about the axle is applied.

When the vehicle makes a turn, if a balance between these moments changes to cause a rotation behavior of the housing about the axle, for example, a toe angle of a rear wheel becomes unstable, causing a fluctuation in lateral force generated by a tire of the rear wheel. This can adversely affect operation stability of the vehicle.

It is desirable to provide a suspension that suppresses a rotation behavior of a housing about an axle when making a stroke.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

A description is given below of a suspension according to a first example embodiment of the disclosure.

The suspension according to the first example embodiment may be used as a rear wheel suspension for a vehicle, e.g., an automobile such as a passenger car.

FIG. 1 is a plan view of the suspension according to the first example embodiment as viewed from above the vehicle.

Figure 2:
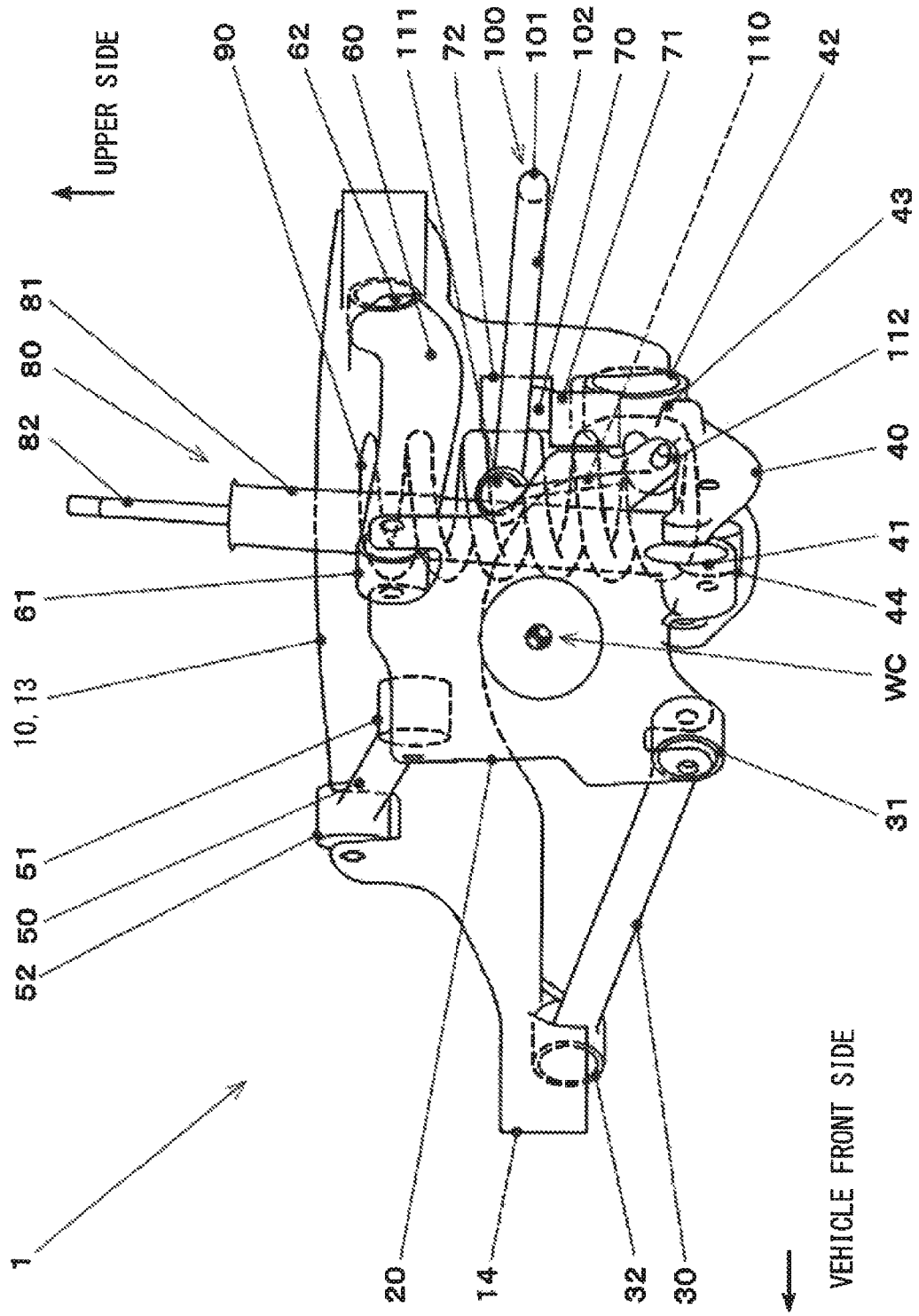
FIG. 2 is a side view of the suspension according to one example embodiment as viewed in a vehicle widthwise direction.

FIG. 2 is a side view of the suspension according to the first example embodiment as viewed in a vehicle widthwise direction, i.e., in a direction of arrows II-II illustrated in FIG. 1).

Figure 3:
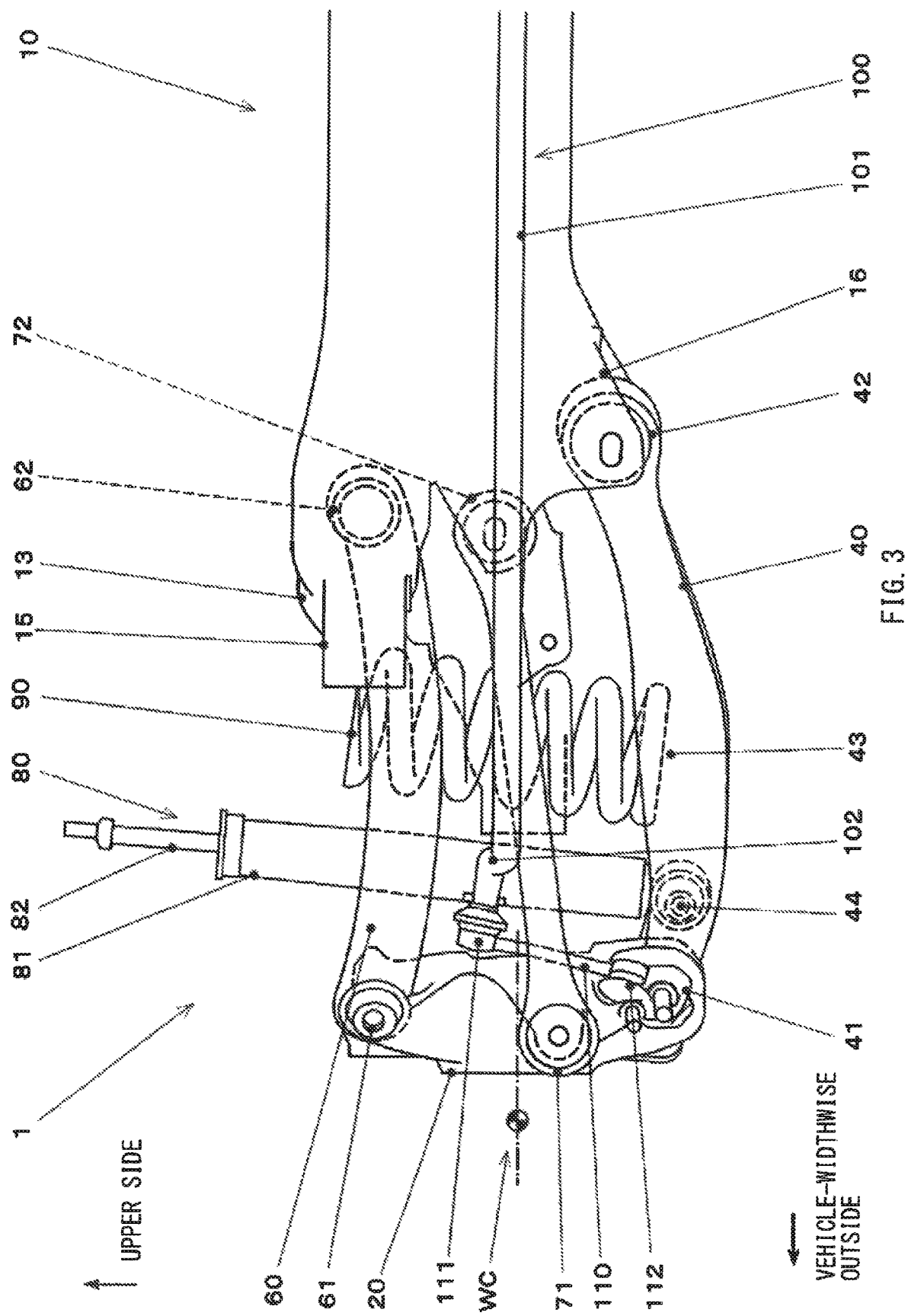
FIG. 3 is a rear view of the suspension according to one example embodiment as viewed from a vehicle rear side.

FIG. 3 is a rear view of the suspension according to the first example embodiment as viewed from a vehicle rear side, i.e., in a direction of arrows III-III illustrated in FIG. 1).

A suspension 1 according to the first example embodiment may be a five-link multilink suspension.

The suspension 1 according to the first example embodiment may include, for example, a sub-frame 10, a housing 20, a front lower link 30, a rear lower link 40, a front upper link 50, a rear upper link 60, a toe control link 70, a shock absorber 80, a spring 90, a stabilizer bar 100, and a stabilizer link 110.

The sub-frame 10 may be a frame-shaped structural member mounted on an underfloor side of a rear part of an unillustrated vehicle body.

The sub-frame 10 may serve as a base to which ends of the links of the suspension 1 on a vehicle body side are coupled.

The sub-frame 10 may include, for example, a front member 11, a rear member 12, and a side member 13.

The front member 11 and the rear member 12 may be beam-shaped parts extending in the vehicle widthwise direction, and may be spaced from each other in a front-rear direction of the vehicle, i.e., a vehicle front-rear direction.

The side member 13 may be a beam-shaped part provided at an end of the sub-frame 10 in the vehicle widthwise direction.

The side member 13 may have a front end 14 and a rear end 15 disposed apart from each other in the vehicle front-rear direction.

In plan view, the side member 13 may be curved to protrude toward the vehicle-widthwise inside.

Ends of the front member 11 and the rear member 12 in the vehicle widthwise direction may each be coupled to an intermediate part of the side member 13.

The front end 14 and the rear end 15 of the side member 13 may each be attached to the vehicle body, for example, via an elastic body such as a rubber-based material.

The front end 14 and the rear end 15 may each be provided with, for example, a cylindrical rubber bush having a central axis direction along a vertical direction.

The housing 20 may be a member, e.g., an upright, that contains an unillustrated hub bearing that rotatably supports a rear wheel RW of the vehicle.

The housing 20 may be supported to be able to be relatively displaced, or make a stroke, in the vertical direction with respect to the sub-frame 10 via the front lower link 30, the rear lower link 40, the front upper link 50, the rear upper link 60, and the toe control link 70, for example.

The front lower link 30, the rear lower link 40, the front upper link 50, and the rear upper link 60 may be configured to cooperate with each other to mainly determine a position of a camber angle of the rear wheel RW.

The front lower link 30 and the rear lower link 40 may be suspension links that couple a lower part of the housing 20 to a lower part of the side member 13 of the sub-frame 10.

The front lower link 30 and the rear lower link 40 may have outer ends 31 and 41 coupled to the housing 20 and inner ends 32 and 42 coupled to the side member 13 of the sub-frame 10.

The outer end 31 and the inner end 32 may be disposed apart from each other in the vehicle widthwise direction. The outer end 41 and the inner end 42 may be disposed apart from each other in the vehicle widthwise direction.

As illustrated in FIG. 2 etc., the outer end 31 of the front lower link 30 may be coupled to a part, of the housing 20, on a lower side and a vehicle front side with respect to a wheel center WC.

The inner end 32 of the front lower link 30 may be coupled to the lower part of the side member 13, at a part on the vehicle front side with respect to the outer end 31 and higher than the outer end 31.

The outer end 41 of the rear lower link 40 may be coupled to a part, of the housing 20, on the lower side and the vehicle rear side with respect to the wheel center WC.

The inner end 42 of the rear lower link 40 may be coupled to a bracket 16 protruding from below the side member 13, at a part on the vehicle rear side with respect to the outer end 41 and higher than the outer end 41.

As illustrated in FIG. 1, FIG. 3, etc., the rear lower link 40 may be provided with a spring seat 43 and a shock absorber connector 44.

The spring seat 43 may have a bearing surface that holds a lower end of the spring 90 to be described later.

The spring seat 43 may be provided on an upper surface of an intermediate part of the rear lower link 40 in a longitudinal direction.

The shock absorber connector 44 may be a part to which a lower end of a shell case 81 of the shock absorber 80 to be described later is coupled swingably.

The shock absorber connector 44 may be disposed between the spring seat 43 and the outer end 41.

With the configuration described above, in the plan view illustrated in FIG. 1, a straight line L1 coupling the outer end 41 and the inner end 42 of the rear lower link 40 may be inclined with respect to the vehicle widthwise direction in such a manner that the vehicle-widthwise outside is on the vehicle front side with respect to the vehicle-widthwise inside.

In the plan view illustrated in FIG. 1, an intersection point of the straight line L1 and a straight line L2 passing through the wheel center WC of the rear wheel RW and extending along the vehicle front-rear direction may serve as a force application point A. At the force application point A, force generated by the shock absorber 80 and the spring 90 may be applied to the housing 20 on a plane including the wheel center WC of the rear wheel RW and orthogonal to an axle.

The force application point A is disposed on the vehicle rear side with respect to the wheel center WC of the rear wheel RW.

The front upper link 50 and the rear upper link 60 may be suspension links that couple an upper part of the housing 20 to an upper part of the side member 13 of the sub-frame 10.

The front upper link 50 and the rear upper link 60 may have outer ends 51 and 61 coupled to the housing 20 and inner ends 52 and 62 coupled to the side member 13 of the sub-frame 10.

The outer end 51 and the inner end 52 may be disposed apart from each other in the vehicle widthwise direction. The outer end 61 and the inner end 62 may be disposed apart from each other in the vehicle widthwise direction.

As illustrated in FIG. 2 etc., the outer end 51 of the front upper link 50 may be coupled to a part, of the housing 20, on an upper side and the vehicle front side with respect to the wheel center WC.

The inner end 52 of the front upper link 50 may be coupled to the upper part of the side member 13, at a part on the vehicle front side with respect to the outer end 51 and higher than the outer end 51.

As illustrated in FIG. 2 etc., as viewed in the vehicle widthwise direction, the outer end 51 of the front upper link 50 may be disposed apart from the outer end 31 of the front lower link 30 in the vertical direction in a front part of the housing 20.

The outer end 51 of the front upper link 50 may be disposed on the vehicle-widthwise inside with respect to the outer end 31 of the front lower link 30.

The inner end 52 of the front upper link 50 may be disposed on the vehicle rear side and the vehicle-widthwise inside with respect to the inner end 32 of the front lower link 30.

As illustrated in FIG. 2 etc., the outer end 61 of the rear upper link 60 may be coupled to a part, of the housing 20, on the upper side and the vehicle rear side with respect to the wheel center WC.

The inner end 62 of the rear upper link 60 may be coupled to the upper part of the side member 13, at a part on the vehicle rear side with respect to the outer end 61.

As illustrated in FIG. 3 etc., as viewed in the vehicle front-rear direction, the inner end 62 may be disposed apart from the outer end 61 in the vehicle widthwise direction.

As illustrated in FIG. 1 etc., the outer end 61 of the rear upper link 60 may be disposed directly above the outer end 41 of the rear lower link 40.

The inner end 62 of the rear upper link 60 may be disposed on the vehicle rear side and the vehicle-widthwise outside with respect to the inner end 42 of the rear lower link 40.

The toe control link 70 may be a suspension link configured to mainly determine a position of a toe angle of the rear wheel RW. In one embodiment, the toe control link 70 may serve as a "control link".

The toe control link 70 may be disposed along the vehicle widthwise direction.

The toe control link 70 may have an outer end 71 coupled to a rear part of the housing 20.

The outer end 71 of the toe control link 70 may be disposed at a position, in a height direction, on the upper side with respect to the outer end 31 of the front lower link 30 and the outer end 41 of the rear lower link 40 and on the lower side with respect to the outer end 51 of the front upper link 50 and the outer end 61 of the rear upper link 60.

The toe control link 70 may have an inner end 72 coupled to the side member 13 of the sub-frame 10.

The inner end 72 of the toe control link 70 may be disposed at a position, in the height direction, on the upper side with respect to the inner end 32 of the front lower link 30 and the inner end 42 of the rear lower link 40 and on the lower side with respect to the inner end 52 of the front upper link 50 and the inner end 62 of the rear upper link 60.

The front lower link 30, the rear lower link 40, the front upper link 50, the rear upper link 60, and the toe control link 70 described above may be swingable with respect to the housing 20 via, for example, respective rubber bushes including elastic bodies, at the outer ends 31, 41, 51, 61, and 71.

The front lower link 30, the rear lower link 40, the front upper link 50, the rear upper link 60, and the toe control link 70 may be swingable with respect to the sub-frame 10 via, for example, respective rubber bushes including elastic bodies, at the inner ends 32, 42, 52, 62, and 72.

As each of the rubber bushes, for example, a cylindrical rubber bush having a central axis in the front-rear direction may be used. Note that the central axis in the front-rear direction herein may include, without being limited to a central axis in a direction completely matching the vehicle front-rear direction, a central axis inclined with respect to the vehicle front-rear direction.

The shock absorber 80 may be a hydraulic damper that generates resistance, or damping force, corresponding to a stroke speed of the suspension 1.

The shock absorber 80 may include, for example, the shell case 81 and a rod 82.

The shell case 81 may be a member including a cylinder with a cylindrical shape.

As illustrated in FIG. 2 and FIG. 3, the shell case 81 may be disposed with its central axis extending substantially along the vertical direction.

The shell case 81 may be gently inclined in such a manner that its upper end is on the vehicle-widthwise inside and the vehicle rear side with respect to its lower end.

The rod 82 may be a shaft-shaped member protruding upward from the upper end of the shell case 81.

The rod 82 may be placed in the cylinder in the shell case 81, and coupled to an unillustrated piston configured to be relatively displaced in an axial direction of the cylinder.

The shock absorber 80 may generate the damping force by expanding and contracting as a protrusion length of the rod 82 changes depending on the stroke of the suspension 1.

The rod 82 may have an upper end attached to a lower part of the vehicle body.

The lower end of the shell case 81 may be attached to the shock absorber connector 44 of the rear lower link 40.

The shell case 81 may be relatively pivotable (swingable) with respect to the rear lower link 40 at the shock absorber connector 44.

The spring 90 may be a spring that transmits a load from the vehicle body to the suspension 1.

The spring 90 may generate reaction force corresponding to the stroke of the suspension 1.

For example, a compressed coil spring may be used as the spring 90.

The spring 90 may be disposed adjacent to the vehicle-widthwise inside of the shock absorber 80.

The spring 90 may have an upper end in pressure contact with an unillustrated spring seat provided on the vehicle body.

The lower end of the spring 90 may be in pressure contact with the spring seat 43 of the rear lower link 40.

The stabilizer bar 100 and the stabilizer link 110 cooperate with each other to configure a stabilizer.

Figure 4:
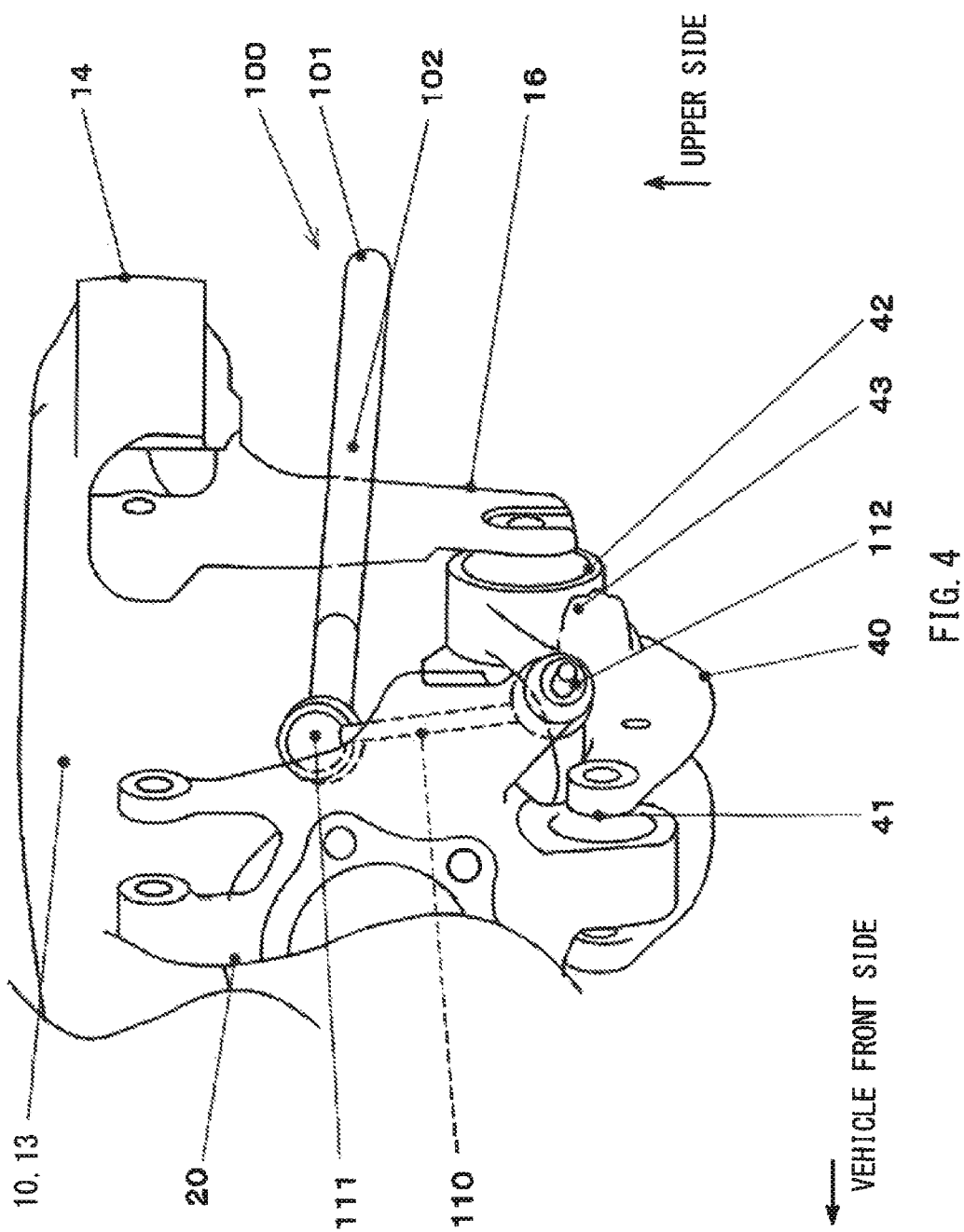
FIG. 4 is a side view of surroundings of a stabilizer link in the suspension according to one example embodiment as viewed in the vehicle widthwise direction.

FIG. 4 is a side view of surroundings of the stabilizer link in the suspension according to the first example embodiment as viewed in the vehicle widthwise direction. Note that, in FIG. 4, the links other than the rear lower link 40, the shock absorber 80, and the spring 90 are omitted for easier understanding. The same applies to FIG. 6 to be described later.

The stabilizer may generate reaction force in a direction of suppressing a roll behavior of the vehicle body, depending on a difference between strokes of the left and right suspensions 1 resulting from the roll behavior, for example, to improve roll stiffness of the vehicle.

The stabilizer bar 100 may include, for example, a wire rod or a bar, such as spring steel.

The stabilizer bar 100 may include an intermediate part 101 and an arm 102.

The intermediate part 101 may be a part extending along the vehicle widthwise direction, as illustrated in FIG. 1 and FIG. 3.

The intermediate part 101 may be disposed on the rear side of the rear member 12 of the sub-frame 10.

The intermediate part 101 may be attached, via an unillustrated stabilizer bush, to an underside of the vehicle body or the rear member 12 of the sub-frame 10.

The intermediate part 101 may serve as a torsion bar spring configured to be twisted depending on the difference between the strokes of the left and right suspensions 1, to generate reaction force corresponding to a torsion angle.

The arm 102 may be a part protruding to the vehicle front side from an end of the intermediate part 101 in the vehicle widthwise direction.

The arm 102 may have a front end to which an upper end 111 of the stabilizer link 110 is coupled.

The front end of the arm 102 may be disposed on the vehicle-widthwise inside of the rear part of the housing 20.

The stabilizer link 110 may be a link that couples the front end of the arm 102 of the stabilizer bar 100 to the housing 20.

The stabilizer link 110 may be disposed with its longitudinal direction extending along the vertical direction.

The upper end 111 of the stabilizer link 110 may be pivotably coupled to the front end of the arm 102 of the stabilizer bar 100 via, for example, a ball joint, e.g., a spherical bearing, or an elastic bush (typically a rubber bush).

The stabilizer link 110 may have a lower end 112 pivotably coupled to a lower part at the rear part of the housing 20 via, for example, a ball joint or an elastic bush.

With the configuration described above, in the first example embodiment, the force application point A where force generated by the spring 90 is applied to the housing 20, and the lower end 112 of the stabilizer link 110 serving as a force application point where force generated by the stabilizer is applied to the housing 20 may both be disposed on the vehicle rear side with respect to the wheel center WC of the rear wheel RW. The force generated by the spring 90 may include spring reaction force of the spring 90 itself and the load transmitted from the vehicle body. The force generated by the stabilizer may be torsion reaction force of the intermediate part 101 of the stabilizer bar 100.

According to the first example embodiment described above, the force application point (application point) A where the force generated by the spring 90 is applied to the housing 20 and the force application point (application point) where the force generated by the stabilizer is applied to the housing 20 are both disposed on the vehicle rear side with respect to the wheel center WC of the rear wheel RW. This makes it possible to suppress a rotation behavior of the housing 20 about the axle caused when the force is generated by the stabilizer at a start of turning, even in the multilink suspension having difficulty in restraining the rotation behavior of the housing about the axle because of occurrence of deflection of the elastic bushes provided on the suspension links.

This makes it possible to reduce a toe change at the rear wheel RW and improve operation stability of the vehicle.

Second Example Embodiment

A description is given next of a suspension according to a second example embodiment of the disclosure.

Figure 5:
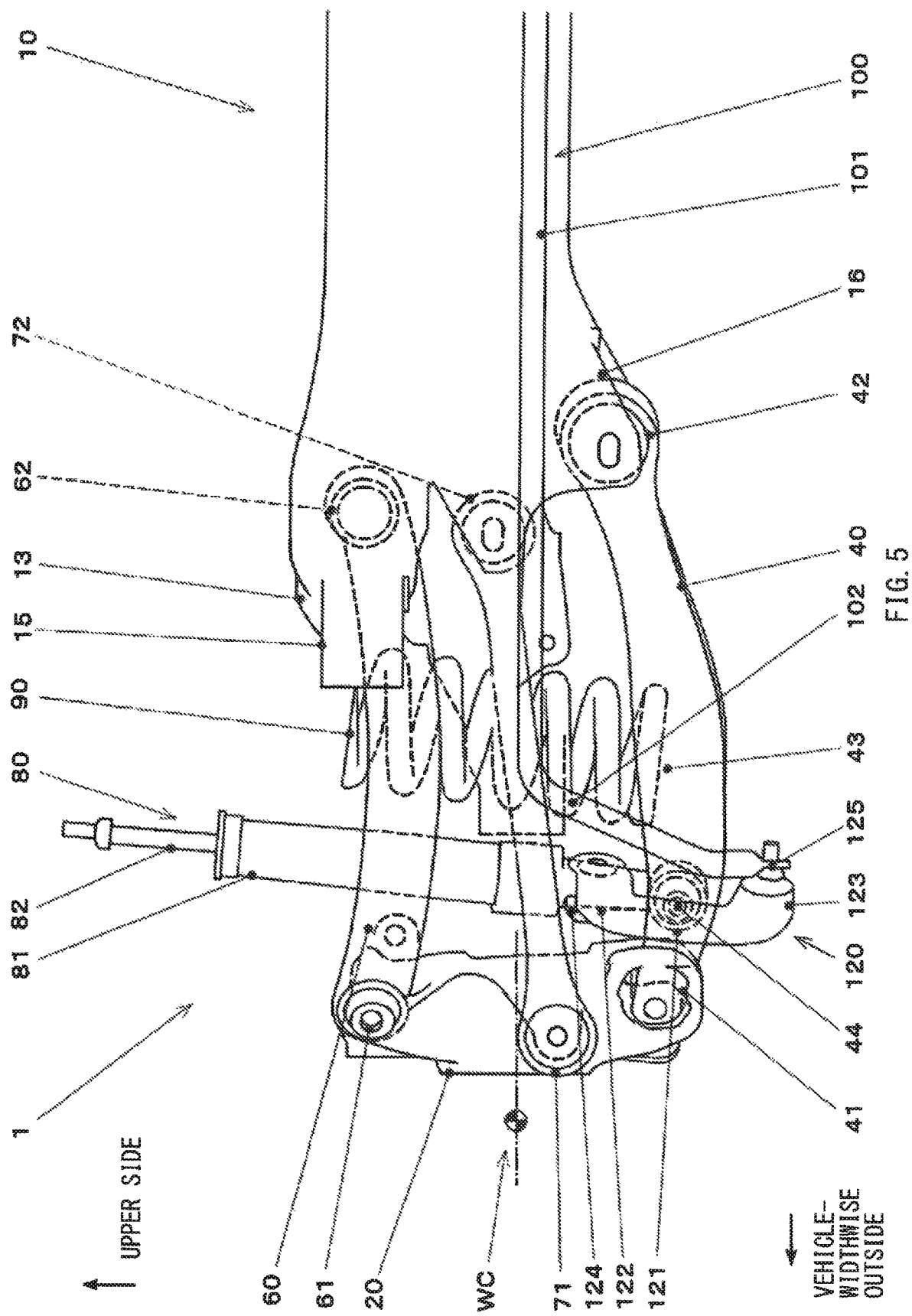
FIG. 5 is a rear view of a suspension according to one example embodiment of the disclosure as viewed from the vehicle rear side.

FIG. 5 is a rear view of the suspension according to the second example embodiment as viewed from the vehicle rear side.

Figure 6:
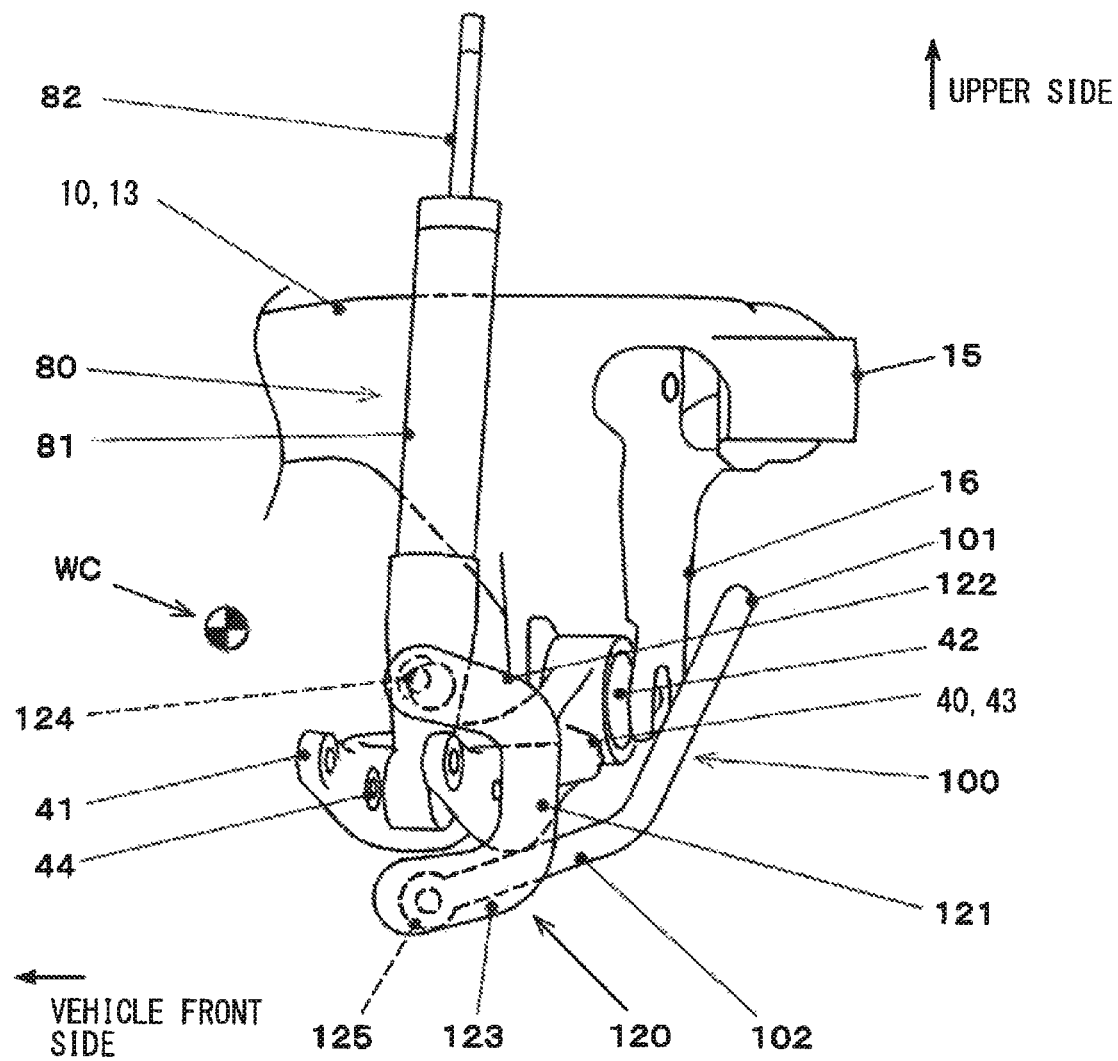
FIG. 6 is a side view of surroundings of a stabilizer link in the suspension according to one example embodiment as viewed in the vehicle widthwise direction.

FIG. 6 is a side view of surroundings of a stabilizer link in the suspension according to the second example embodiment as viewed in the vehicle widthwise direction.

In the second example embodiment, the stabilizer link may have an end coupled to the shell case 81 of the shock absorber 80.

In the second example embodiment, a stabilizer link 120 described below may be provided in place of the stabilizer link 110 in the first example embodiment.

In the second example embodiment, the arm 102 of the stabilizer bar 100 may protrude to the vehicle front side and the lower side with respect to the intermediate part 101.

The protruding end of the arm 102 may be disposed on the lower side of the rear lower link 40.

The stabilizer link 120 may include an intermediate part 121, an upper part 122, and a lower part 123 provided as a one-piece member.

The intermediate part 121 may be a part extending in the vertical direction.

The intermediate part 121 may be disposed on the rear side of the rear lower link 40.

The upper part 122 may be an arm-shaped part protruding from an upper end of the intermediate part 121 to the vehicle front side.

The lower part 123 may be an arm-shaped part protruding from a lower end of the intermediate part 121 to the vehicle front side.

The upper part 122 of the stabilizer link 120 may have a front end 124 coupled to an outer peripheral surface of the shell case 81 of the shock absorber 80 to be swingable about an axis extending along the vehicle widthwise direction.

The lower part 123 of the stabilizer link 120 may have a front end 125 swingably coupled to the rear part of the housing 20.

The front end 125 of the lower part 123 may be provided with, for example, a ball joint, e.g., a spherical bearing.

According to the second example embodiment described above, it is possible to achieve example effects similar to those of the first example embodiment described above. In addition, it is possible to match the force application point where the force generated by the stabilizer is applied to the housing 20 with the force application point A where the force generated by the spring 90 is applied to the rear wheel RW. This makes it possible to promote the effect of suppressing the rotation behavior of the housing 20.

Third Example Embodiment

A description is given next of a suspension according to a third example embodiment of the disclosure.

Figure 7:
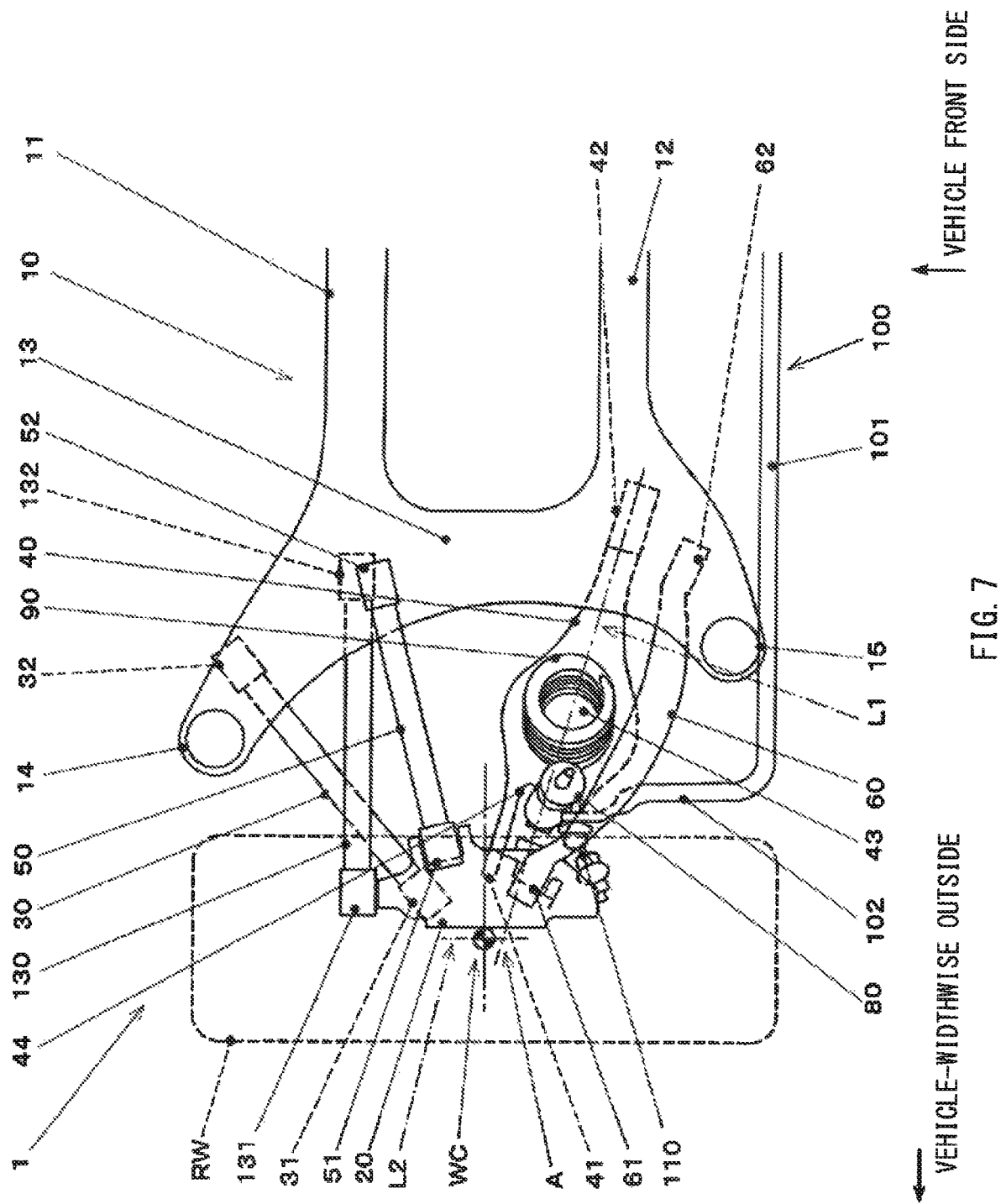
FIG. 7 is a plan view of a suspension according to one example embodiment of the disclosure as viewed from above the vehicle.

FIG. 7 is a plan view of the suspension according to the third example embodiment as viewed from above the vehicle.

The suspension according to the third example embodiment may include a toe control link 130 described below in place of the toe control link 70 in the first example embodiment.

The toe control link 130 may have an outer end 131 coupled to a front end of the housing 20.

The toe control link 130 may have an inner end 132 coupled to the side member 13 of the sub-frame 10, on the vehicle-widthwise inside with respect to the outer end 131.

Also in the third example embodiment described above, it is possible to achieve example effects similar to those of the first example embodiment described above.

Note that, even in a case where the toe control link 130 is disposed on the front side of the housing 20 as in the third example embodiment, a configuration may be adopted in which the stabilizer link is coupled to the shell case 81 of the shock absorber 80 as in the second example embodiment.

Modification Examples

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

(1) Shapes, structures, materials, manufacturing methods, numbers, arrangements, etc. of the members included in the suspension may be changed as appropriate, without being limited to the example embodiments described above.

For example, a configuration of the suspension may be changed as appropriate, without being limited to the five-link multilink configuration as in the example embodiments.

For example, the front upper link 50 and the rear upper link 60 may be replaced with a single upper link.

The shock absorber and the spring may be provided coaxially as a unit.

(2) In the example embodiments, two ends, or joints, of the suspension link may each be provided with an elastic bush such as a cylindrical rubber bush. However, some of the joints may be provided with a ball joint, e.g., a spherical bearing (a so-called pillow ball).

(3) Shapes and configurations of the stabilizer bar and the stabilizer link included in the stabilizer may be changed as appropriate, without being limited to the configurations according to the example embodiments, as long as the force application point where the force generated by the stabilizer is applied to the housing is on the rear side with respect to the wheel center, (4) In the example embodiments, the ends of the spring and the shock absorber on a spring lower side may be coupled to the rear lower link. The spring lower side may refer to the side that undergoes displacement with respect to the vehicle body depending on the stroke. However, without being limited thereto, the ends of the spring and the shock absorber on the spring lower side may be coupled, for example, to any of the other links or to the housing.

In another example, the spring and the shock absorber may be coupled to different members.

According to at least one embodiment of the disclosure, it is possible to provide a suspension that suppresses a rotation behavior of a housing about an axle when making a stroke.

The invention claimed is:

1. A suspension to be applied to a vehicle, the suspension comprising:
a housing configured to rotatably support a rear wheel of the vehicle;
suspension links each having both ends swingably coupled to a vehicle body of the vehicle and the housing;
a spring disposed between the vehicle body and one of the suspension links or between the vehicle body and the housing; and
a stabilizer including:
a stabilizer bar configured to generate reaction force corresponding to a stroke difference between left and right housings each serving as the housing; and
a stabilizer link coupling both ends of the stabilizer bar to the left and right housings respectively,
wherein a force application point where force generated by the spring is applied to the housing is disposed on a rear side of the vehicle with respect to a center of the rear wheel,
wherein the stabilizer link is coupled to the housing to allow a force application point where force generated by the stabilizer is applied to the housing to be disposed on the rear side of the vehicle with respect to the center of the rear wheel, and
wherein, in a vehicle-widthwise direction, a coupling between the stabilizer link and the housing is positioned between the spring and the center of the rear wheel.

2. The suspension according to claim 1, wherein the suspension links include:
a lower link coupling a lower part of the housing to the vehicle body;
an upper link coupling an upper part of the housing to the vehicle body; and
a control link coupling a front part of the housing or a rear part of the housing to the vehicle body.

3. The suspension according to claim 2, wherein the lower link comprises a front lower link and a rear lower link disposed apart from each other in a front-rear direction of the vehicle, and
wherein the upper link comprises a front upper link and a rear upper link provided apart from each other in the front-rear direction of the vehicle.

4. The suspension according to claim 1, wherein the stabilizer link is coupled to the housing to allow the force application point where the force generated by the stabilizer is applied to the housing to be disposed below the center of the rear wheel.

5. A suspension to be applied to a vehicle, the suspension comprising:

a housing configured to rotatably support a rear wheel of the vehicle;
suspension links each having both ends swingably coupled to a vehicle body of the vehicle and the housing;
a spring disposed between the vehicle body and one of the suspension links or between the vehicle body and the housing;
a shock absorber disposed between the vehicle body and one of the suspension links or between the vehicle body and the housing; and
a stabilizer including:
  a stabilizer bar configured to generate reaction force corresponding to a stroke difference between left and right housings each serving as the housing; and
  a stabilizer link coupling both ends of the stabilizer bar to respective left and right shock absorbers each serving as the shock absorber,
wherein a force application point where force generated by the spring is applied to the housing is disposed on a rear side of the vehicle with respect to a center of the rear wheel,
wherein the stabilizer link is coupled to the shock absorber to allow a force application point where force generated by the stabilizer is applied to the housing to be disposed on the rear side of the vehicle with respect to the center of the rear wheel,
wherein the stabilizer link is directly coupled to a shell case of the shock absorber, and
wherein, in a vehicle-widthwise direction, a coupling between the stabilizer link and the shell case is positioned between the spring and the center of the rear wheel.

6. The suspension according to claim 5, wherein the spring and the shock absorber have respective lower ends coupled to a same one of the suspension links.

7. The suspension according to claim 5, wherein the suspension links include:
a lower link coupling a lower part of the housing to the vehicle body;
an upper link coupling an upper part of the housing to the vehicle body; and
a control link coupling a front part of the housing or a rear part of the housing to the vehicle body.

8. The suspension according to claim 6, wherein the suspension links include:
a lower link coupling a lower part of the housing to the vehicle body;
an upper link coupling an upper part of the housing to the vehicle body; and
a control link coupling a front part of the housing or a rear part of the housing to the vehicle body.

9. The suspension according to claim 7, wherein the lower link comprises a front lower link and a rear lower link disposed apart from each other in a front-rear direction of the vehicle, and
wherein the upper link comprises a front upper link and a rear upper link provided apart from each other in the front-rear direction of the vehicle.

10. The suspension according to claim 8, wherein the lower link comprises a front lower link and a rear lower link disposed apart from each other in a front-rear direction of the vehicle, and
wherein the upper link comprises a front upper link and a rear upper link provided apart from each other in the front-rear direction of the vehicle.

11. The suspension according to claim 5, wherein the stabilizer link is coupled to the housing to allow the force application point where the force generated by the stabilizer is applied to the housing to be disposed below the center of the rear wheel.

12. A suspension to be applied to a vehicle, the suspension comprising:
a housing configured to rotatably support a rear wheel of the vehicle;
suspension links each having both ends swingably coupled to a vehicle body of the vehicle and the housing, the suspension links including:
a lower link coupling a lower part of the housing to the vehicle body;
an upper link coupling an upper part of the housing to the vehicle body; and
a control link coupling a front part of the housing or a rear part of the housing to the vehicle body, the lower link including a front lower link and a rear lower link disposed apart from each other in a front-rear direction of the vehicle, the upper link including a front upper link and a rear upper link provided apart from each other in the front-rear direction of the vehicle;
a spring disposed between the vehicle body and the rear lower link;
a shock absorber disposed between the vehicle body and the rear lower link, the shock absorber including a shell case coupled to the rear lower link, the spring being disposed adjacent to a vehicle-widthwise inside of the shock absorber; and
a stabilizer including:
  a stabilizer bar; and
  a stabilizer link including a first coupling and a second coupling, the first coupling being coupled to the stabilizer bar, the second coupling being coupled to the housing or the shell case,
wherein a force application point where force generated by the spring is applied to the housing is disposed on a rear side of the vehicle with respect to a center of the rear wheel,
wherein the second coupling is disposed on the rear side of the vehicle with respect to the center of the rear wheel and to be disposed below the center of the rear wheel.

* * * * *